United States Patent
Kim et al.

(10) Patent No.: US 10,074,160 B2
(45) Date of Patent: Sep. 11, 2018

(54) POINT CLOUD NOISE AND OUTLIER REMOVAL FOR IMAGE-BASED 3D RECONSTRUCTION

(71) Applicant: Disney Enterprises, Inc., Burbank, CA (US)

(72) Inventors: Changil Kim, Zürich (CH); Olga Sorkine-Hornung, Zürich (CH); Christopher Schroers, Zürich (CH); Henning Zimmer, Zürich (CH); Katja Wolff, Zürich (CH); Mario Botsch, Bielefeld (DE); Alexander Sorkine-Hornung, Zürich (CH)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 27 days.

(21) Appl. No.: 15/283,121

(22) Filed: Sep. 30, 2016

(65) Prior Publication Data

US 2018/0096463 A1    Apr. 5, 2018

(51) Int. Cl.
*G06T 15/00*    (2011.01)
*G06T 5/00*    (2006.01)
(Continued)

(52) U.S. Cl.
CPC .............. *G06T 5/002* (2013.01); *G06T 13/40* (2013.01); *G06T 15/06* (2013.01); *G06T 17/20* (2013.01);
(Continued)

(58) Field of Classification Search
None
See application file for complete search history.

(56) References Cited

U.S. PATENT DOCUMENTS

| 8,619,082 B1 * | 12/2013 | Ciurea ................... G06T 7/593 345/427 |
| 2012/0147205 A1 * | 6/2012 | Lelescu .............. H04N 13/0029 348/218.1 |

(Continued)

OTHER PUBLICATIONS

Merrell et al. ; "Real-time Visibilty based fusion of depth maps;" In Proc. CVPR, 2007; p. 1-8.*

(Continued)

*Primary Examiner* — Peter Hoang
(74) *Attorney, Agent, or Firm* — Kilpatrick Townsend & Stockton LLP

(57) ABSTRACT

Enhanced removing of noise and outliers from one or more point sets generated by image-based 3D reconstruction techniques is provided. In accordance with the disclosure, input images and corresponding depth maps can be used to remove pixels that are geometrically and/or photometrically inconsistent with the colored surface implied by the input images. This allows standard surface reconstruction methods (such as Poisson surface reconstruction) to perform less smoothing and thus achieve higher quality surfaces with more features. In some implementations, the enhanced point-cloud noise removal in accordance with the disclosure can include computing per-view depth maps, and detecting and removing noisy points and outliers from each per-view point cloud by checking if points are consistent with the surface implied by the other input views.

20 Claims, 9 Drawing Sheets

(51) Int. Cl.
   *G06T 15/06* (2011.01)
   *G06T 17/20* (2006.01)
   *G06T 13/40* (2011.01)
(52) U.S. Cl.
   CPC ........... *G06T 2207/10024* (2013.01); *G06T 2207/10028* (2013.01)

(56) References Cited

U.S. PATENT DOCUMENTS

2014/0327674 A1* 11/2014 Sorkine-Hornung ..... G06T 7/50
   345/426
2016/0125637 A1* 5/2016 Hyllus ................... G06T 17/00
   382/154

OTHER PUBLICATIONS

Wolff et al. ; Point Cloud Noise and Outlier Removal for Image-based 3D reconstruction; 3D Vision (3DV), 2016 4th international conference; p. 1-10.*
Alexa et al., "Computing and rendering point set surfaces.", IEEE Trans. Vis. and Comput. Graph. vol. 9, No. 1, 2003, pp. 3-15.
Berger et al., "State of the art in surface Reconstruction from Point Clouds", Eurographics 2014—State of the Art Reports, 2014, pp. 161-185.
Blais et al., "Review of 20 years of range sensor development", Journal of Electronic Imaging vol. 13, No. 1, 2004, pp. 231-243.
Calakli et al., "SSD-C: Smooth Signed Distance Surface Reconstruction", Comput. Graph. Forum vol. 30, No. 7, 2011, pp. 1993-2002.
Collins et al., "A Space-Sweep Approach to True Multi-Image Matching", In Proc. CVPR, 1996, pp. 358-363.
Curless et al., "A volumetric method for building complex models from range images", In Proc. ACM SIGGRAPH, 1996, pp. 303-312.
Fuhrmann et al., "Floating Scale Surface Reconstruction", ACM Transactions on Graphics, vol. 33, No. 4, 2014, 11 pages.
Fuhrmann et al., "MVE—A Multiview Reconstruction Environment", In Eurographics Workshop on Graphics and Cultural Heritage, Oct. 2014, 8 pages.
Goesele et al., "Multi-view Stereo for Community Photo Collections", IEEE, International Conference on Computer Vision, Oct. 2007, 8 pages.
Guennebaud et al., "Algebraic point set surfaces", ACM Trans. Graph. vol. 26, No. 3, 2007, 9 pages.
Hartley et al., "Multiple view geometry in computer vision", 2. ed., Cambridge University Press, 2006.

Hoppe et al., "Surface reconstruction from unorganized points", In Proc. ACM SIGGRAPH Proceedings, 1992, pp. 71-78.
Huang et al., "Consolidation of unorganized point clouds for surface reconstruction", ACM Trans. Graph. vol. 28, No. 5, 2009, pp. 176:1-176:7.
Huang et al., "Edge-aware point set resampling", ACM Trans. on Graphics vol. 32. No. 1, 2013, pp. 9:1-9:12.
Kazhdan et al., "Poisson surface reconstruction", In Proc. SGP, 2006, pp. 61-70.
Kazhdan et al., "Screened poisson surface reconstruction", ACM Trans. Graph. vol. 32, No. 3, 2013, pp. 29:1-29:13.
Kim et al., "Scene Reconstruction from High Spatio-Angular Resolution Light Fields", ACM Transactions on Graphics, vol. 32, No. 4, Jul. 2013, 11 pages.
Lipman et al., "Parameterization-free projection for geometry reconstruction", ACM Trans. Graph. vol. 26, No. 3, 2007, 6 pages.
Manson et al., "Streaming surface reconstruction using wavelets", Comput. Graph. Forum vol. 27, No. 5, 2008, 10 pages.
Öztireli et al., "Feature preserving point set surfaces based on non-linear kernel regression", Comput. Graph. Forum vol. 28, No. 2, 2009, pp. 493-501.
Rusu et al., "Towards 3D point cloud based object maps for household environments", Robotics and Autonomous Systems vol. 56, No. 11, 2008, pp. 927-941.
Schroers et al., "A variational taxonomy for surface reconstruction from oriented points", Comput. Graph. Forum vol. 33, No. 5, 2014, pp. 195-204.
Seitz et al., "A Comparison and Evaluation of Multi-View Stereo Reconstruction Algorithms", IEEE Computer Society Conference on Computer Vision and Pattern Recognition, Jun. 2006, 8 pages.
Shan et al., "Occluding contours for multi-view stereo", In Proc. CVPR, 2014, pp. 4002-4009.
Shen et al., "Interpolating and approximating implicit surfaces from polygon soup", ACM Trans. Graph., 2004, pp. 896-904.
Sun et al., "Denoising point sets via L0 minimization", CAGD vol. 35, 2015, 15 pages.
Ummenhofer et al., "Global, dense multiscale reconstruction for a billion points.", In Proc. ICCV, 2015, pp. 1341-1349.
Walder et al., "Implicit surface modelling with a globally regularised basis of compact support.", Comput. Graph. Forum, 2006, pp. 635-644.
Wu et al., "Deep points consolidation", ACM Trans. Graph. vol. 34, No. 6, 2015.
Yücer et al., "Efficient 3D Object Segmentation from Densely Sampled Light Fields with Applications to 3D Reconstruction.", ACM Transactions on Graphics, vol. 35, No. 3, Jun. 2016, 15 pages.
Zhang et al., "Consistent Depth Maps Recovery from a Video Sequence", IEEE Transactions on Pattern Analysis and Machine Intelligence, vol. 31, No. 6, Jun. 2009, pp. 974-988.

\* cited by examiner

Algorithm 1: Pseudocode for our noise and outlier removal algorithm.

input : $N$ depth maps $D_i$, $N$ camera matrices $P_i$ (including the camera view vectors $v_i$), $N$ RGB images $I_i$.
parameters: $\sigma, t_d, t_p, t_v$
output: filtered 3D points with normals forall the *depth maps $D_i$* do
    $\{p\} \leftarrow$ project all pixels of $D_i$ into 3D (using camera matrices $P_i$);
    forall the *3D points $p$ of $D_i$* do
        compute normal (using PCA on a patch of size $7 \times 7$) // refer to Equation 1
        compute weights $w_i(p)$ from normals // see Equation 3 filtered_points $\leftarrow \emptyset$
forall the *depth maps $D_i$* do
    forall the *3D points $p$ of $D_i$* do
        $d(p), w(p), v(p), s, s2 \leftarrow 0$
        forall the *depth maps $D_j$* do
            $(u, v, z) \leftarrow$ project $p$ into $D_j$ (using camera matrices $P_j$) // here $u$ and $v$ denote the coordinates in image space and $z$ denotes the depth value
            get the triangle in which $(u,v)$ is contained // see FIGS. 3-4 this means checking whether $(u,v)$ is contained in image space and determining three integer coordinates for the triangle corners - an upper left triangle or a lower right triangle
            if $v_j^T v_i > 0$ *or $(u,v)$ lies in no triangle or the smallest angle of the triangle $< 1$ degree* then
                continue
            interpolate weight $w$ from triangle corner weights $w_j(p)$
            interpolate depth value $z(p)$ from the depth values of triangle vertices
            $d \leftarrow z(p) - z$
            if $d < -\sigma$ then // $p$ could not have been observed from this view
                continue
            if $d > \sigma$ then // $p$ is far from the observed range surface, therefore truncate $d$
                $d \leftarrow \sigma$
            $d(p) \leftarrow \frac{w(p)d(p)+wd}{w(p)+w}$ // see Equation 4
            $w(p) \leftarrow w(p) + w$
            if $d \neq \sigma$ then // update photoconsistency only for range surfaces close to $p$
                interpolate color value $c$ from the color values of triangle vertices (from the RGB image $I_j$)
                $s \leftarrow s + c$
                $s2 \leftarrow s2 + c^T c$
                $v(p) = v(p) + 1$
        $p(p) = \sqrt{(s2 - s^T s / v(p))/v(p)} \cdot \frac{2}{255\sqrt{3}}$ // see Equation 5; scaled to $[0,1]$
        if $-t_d < d(p) < 0$ *and* $p(p) < t_p$ *and* $v(p) > t_v$ then
            filtered_points $\leftarrow$ filtered_points $\cup$ $p$
return filtered_points

FIG. 9

POINT CLOUD NOISE AND OUTLIER REMOVAL FOR IMAGE-BASED 3D RECONSTRUCTION

BACKGROUND OF THE INVENTION

This disclosure relates to computer animation for creating a 3D model, in particular for creating a 3D model based on 2D images.

Acquiring the 3D geometry of real-world objects is generally known in the art. In computer vision, image-based scene reconstruction techniques are used to create a 3D model of a scene, given a set of 2D images of the scene. Many 3D reconstruction techniques are known in the art. For example, passive techniques that analyze a multitude of images of the scene and are referred to as, by those skilled in the art, multiview stereo or photogrammetry methods. These image-based methods can construct a 3D model relatively simply and cheaply by employing standard imaging hardware like consumer digital cameras. These image-based methods can provide color information of the scene and offer high resolution scanning thanks to the advances in image sensors. Most multi-view stereo methods filter, smooth, or denoise the reconstructed depth maps, and often these steps are integrated into the depth estimation stage and formulated as a (global) optimization problem.

One common approach employed by the multiview stereo methods for constructing a 3D model is to first compute camera poses and then estimate depth maps for all views by finding corresponding pixels between views and triangulating depth. Under that approach, all pixels are then projected into 3D space to obtain a point cloud from which a surface mesh can be extracted using point cloud meshing techniques.

However, one drawback of the approach described above is that it is prone to producing outliers and noise in the depth maps due to matching ambiguities or image imperfections (such as lens distortion, sensor noise, etc.). The resulting point clouds under that approach are often noisy. Typically, the meshes computed from such noisy point clouds either miss many details (when a lot of regularization is applied) or reconstruct wrong geometry that often manifests itself in disturbing blobs. A common remedy to reduce outliers in image-based methods is, similarly to the surface reconstruction, to use strong smoothing or regularization in the depth computation, but this inevitably destroys fine details and is also costly to compute as it typically comes down to solving large global optimization problems.

BRIEF SUMMARY OF THE INVENTION

Embodiments can provide enhanced removing of noise and outliers from one or more point sets generated by image-based 3D reconstruction techniques. In accordance with the disclosure, input images and corresponding depth maps can be used to remove pixels that are geometrically and/or photometrically inconsistent with the colored surface implied by the input images. This allows standard surface reconstruction methods (such as Poisson surface reconstruction) to perform less smoothing and thus achieve higher quality surfaces with more features. Comparing with the conventional approach described above, embodiments can be easy to implement, and more effectively remove varying amounts of noise to more accurately construct the 3D model. The enhanced point-cloud noise removal in accordance with the disclosure can work with any image-based techniques to reconstruct scene geometry in the form of depth maps and any surface reconstruction technique that takes a point set as input. The enhanced point-cloud noise removal in accordance with the disclosure can be a versatile way to enhance image-based 3D reconstruction and facilitating the standard workflow. The enhanced point-cloud noise removal in accordance with the disclosure can also improve computational efficiency when processing large datasets (e.g., depth maps) comparing with conventional technologies.

In some implementations, the enhanced point-cloud noise removal in accordance with the disclosure can include computing per-view depth maps using a desired depth estimation methods, such as one with little to no regularization to reconstruct as much detail as possible. The enhanced point-cloud noise removal can then involve detecting and removing noisy points and outliers from each per-view point cloud by checking if points are consistent with the surface implied by the other input views. Under this approach, geometric consistency of the points can be evaluated, and photometric consistency between the input views can also be considered. Under this approach, subsequent surface reconstruction can be less demanding, allowing common techniques to produce favorable surface meshes with a high degree of detail.

Other objects and advantages of the invention will be apparent to those skilled in the art based on the following drawings and detailed description.

BRIEF DESCRIPTION OF THE DRAWINGS

FIG. 9 illustrates one example of pseudo code for implementing the method described herein.

DETAILED DESCRIPTION OF THE INVENTION

Figure 1:
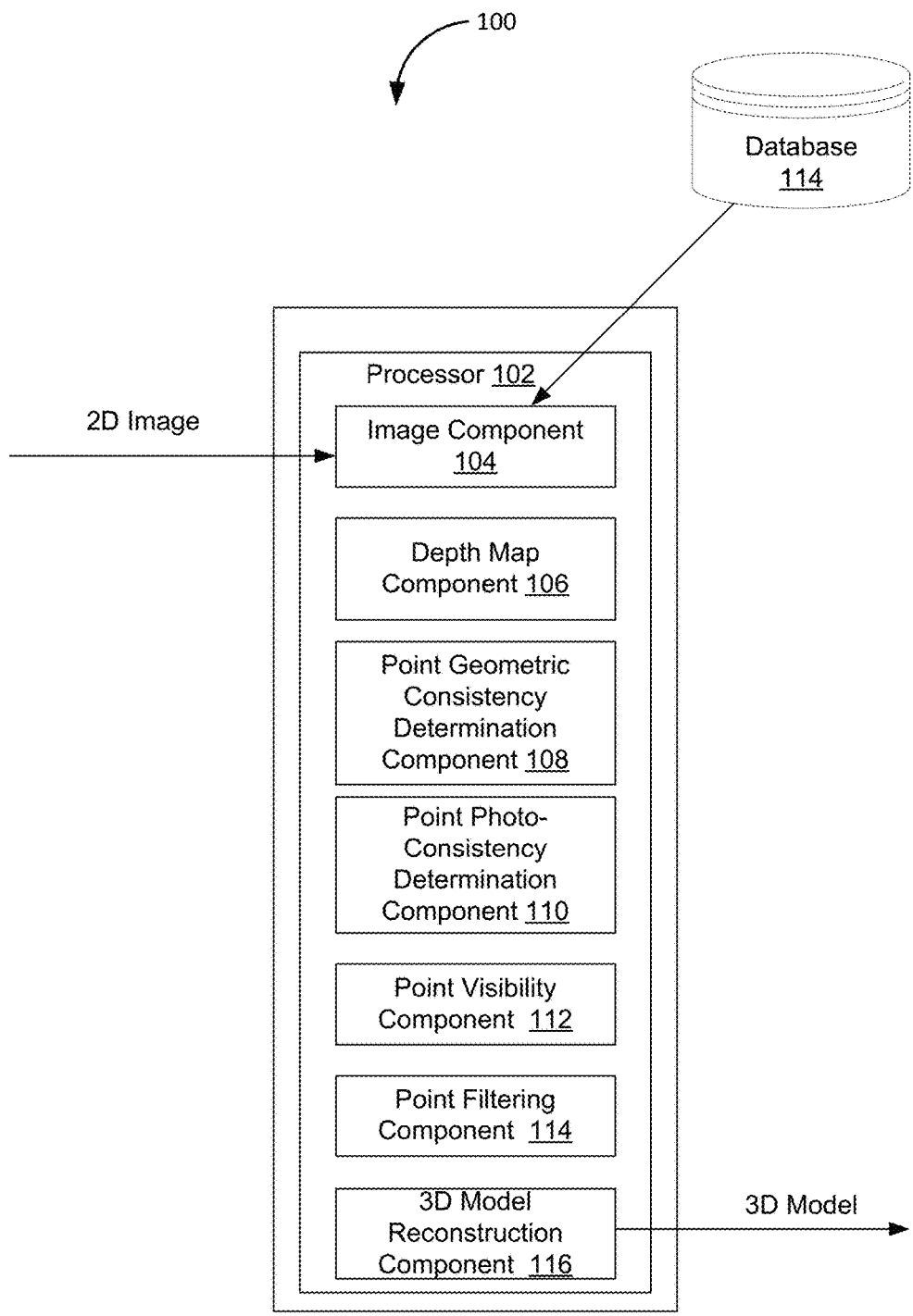
FIG. 1 illustrates an example of a system configured for providing enhanced removing of noise and outliers from point sets generated by image-based 3D reconstruction techniques.

Embodiments can provide enhanced removing of noise and outliers from point sets generated by image-based 3D reconstruction techniques. Most multi-view stereo methods filter, smooth, or denoise the reconstructed depth maps, and often these steps are integrated into the depth estimation stage and formulated as a (global) optimization problem. However, these methods often leave a significant amount of noise and outliers in their final reconstructions, necessitating an additional outlier removal step for the point sets to be suitable for the later surface reconstruction phase. Various attempts have been made to remove the noise and outlier in the point sets. For example, techniques have been proposed to reconstruct dense depth maps from sparse point clouds which they use to remove points that are in significant visibility conflict and to augment the input point cloud. However, these techniques treat each view separately when densifying sparse depth maps and require the modification of the standard Poisson surface reconstructor. Techniques have also been proposed as more dedicated point cloud denoising and outlier techniques. For example, a point cloud denoising method imposing sparsity of the solution via L0 minimization has been proposed to optimize both point normals and positions with the piecewise smoothness assumption, thereby preserving sharp feature. As another example, a point cloud refinement method with the application of indoor environment mapping was also presented to remove noise and outlier points based on statistical analysis of input points. However, these techniques are limited in that they consider the point positions only and do not consider further information like color or scanner positions and explicitly assumes laser scanning as the point input source. Some methods use accurate foreground segmentation of a dense image set to refine the bounding volume of the object, resulting in a detailed visual hull and subsequently using it to filter out outliers from the point cloud. However, the resulting visual hull does not filter points in concavities and may not be tight enough.

Since geometry acquisition inevitably includes measurement noise at varying degrees, many surface reconstruction methods are generally known in the art to provide some form of smoothing mechanisms to deal with the acquisition noise and to adapt to the varying quality of the acquired point clouds. For example, a family of methods uses moving least-squares (MLS) to resample a potentially smoother and more uniform point set by locally fitting and projecting points onto a smooth surface represented by a low-degree polynomial. Instead of computing local projections, these methods can allow reconstruction of an implicit representation of the surface. However, these methods still do not handle removal of outliers very well.

Similarly, a method of using the parameterization-free projection operator has been proposed to result in a resampled point cloud by means of point projection, but onto a multivariate median, being more robust to noise and able to detect outlier. By taking into account the point density, this method was extended to deal with sharp features and a high level of non-uniformity. This method has led to a class of methods, called point consolidation. These methods include multiple stages of point cloud processing, from merging points to denoising, decimating, and redistributing them such that they become more suitable for later surface reconstruction. Based on this principle, the enhanced noise and outlier removal in accordance with the disclosure involves actively using the information available exclusively to the image-based reconstruction workflows, namely, color information and 3D camera poses, which purely geometry-based methods usually do not have access to. The enhanced noise and outlier removal in accordance with the disclosure can implicitly use a surface represented by the input depth maps when examining each point, similarly to range image integration methods, e.g., as described by Curless and Levoy and KinectFusion proposed by Newcombe et al., both of which are incorporated by reference in their entirety herein. While most existing methods use a volumetric representation to cache the implicit function in 3D space, the enhanced noise and outlier removal in accordance with the disclosure can operate directly on the image space, avoiding premature explicit discretization and large memory usage. Under the enhanced noise and outlier removal in accordance with the disclosure, color information can be used for semantic analysis (also see the survey of Berger et al., which is incorporated by reference in its entirety herein), and also can be used in conjunction with the input point geometry.

Figure 3:
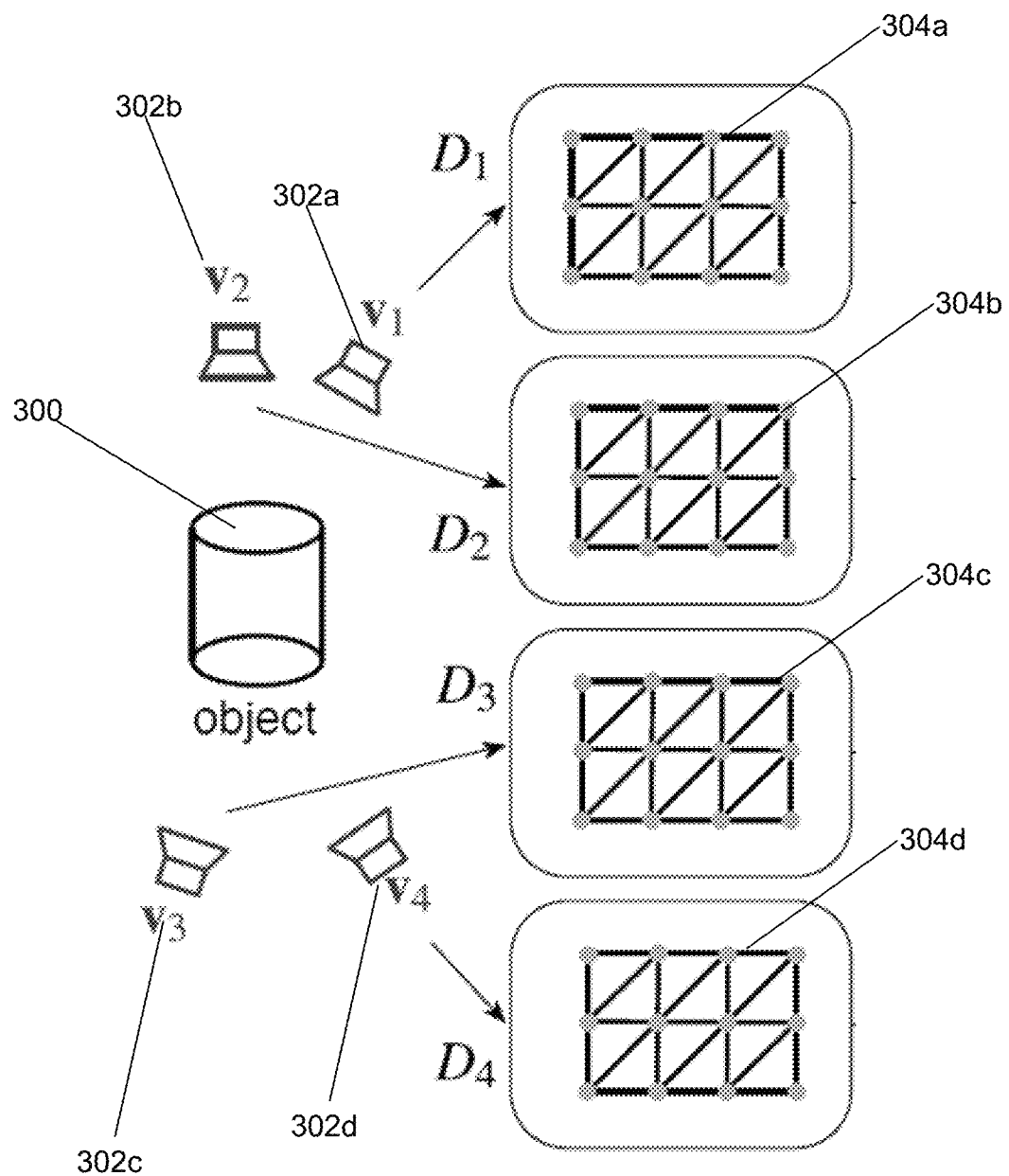
FIG. 3 illustrates that the depth maps obtained for each image taken at viewpoints respectively are triangulated, where i can be any arbitrary number that is greater than 1.

Attention is now directed to FIG. 1, where an example of a system 100 configured for providing enhanced removing of noise and outliers from point sets generated by image-based 3D reconstruction techniques is illustrated. As shown, the system 100 can include one or more of a processor 102 configured to execute program components, which can include an image component 104, a depth map component 106, a point surface distance determination component 108, a point photo-consistency determination component 110, a point visibility determination component 112, a 3D model reconstruction component 114, and/or any other components. The image component 104 can be configured to receive images of a scene, an object, a person, and/or any other subject. For example, the images received by the image component 104 can include a collection of images of the object, the scene, the person, and/or any other subject taken from known camera viewpoints. Each image in the collection can represent a view of the object, the scene, or the person from a corresponding viewpoint. An example of images taken for an object at different viewpoints that can be received by the image component 104 is illustrated in FIG. 3. In some embodiments, the images received by the image component 104 can include calibrated input images such that projection of any 3D point in the scene in each image is known. In those embodiments, the image component 104 may be configured to calibrate the input images. In some embodiments, the images received by image component 104 can include grayscale or color images. In some embodiments, the images received by the image component 104 can include silhouette images, i.e. binary images, with the value at a point indicating whether or not the visual ray from the optical center through that image point intersects an object surface in the scene. In those embodiments, the binary images can be used as additional cues. In some implementations, the image component 104 can be configured to receive the images from a database such as a database 114 as shown. In some implementations, the image component 104 can be configured to receive the images from a camera, an animation tool, a 3D model authoring tool, and/or any other tools.

The depth map component 106 can be configured to obtain depth maps for the images received by the image component 104. A given depth map for a given image as obtained by the depth map component 106 can contain information relating to the distance of the surfaces of one or more scene objects from a viewpoint as captured in the given image. In some embodiments, obtaining the depth maps by the depth map component 106 may include generating the depth maps from the images received by the image component 104. Generating depth maps are generally known in the art. For example, generating the depth maps by the depth map component 106 can include estimating depth maps for all views by finding corresponding pixels between views and triangulating depth, as described by Hartley et al (A. Hartley and A. Zisserman. Multiple view geometry in computer vision (2. ed.). Cambridge University Press, 2006), which is incorporated by reference in its entirety. In some implementations, the depth maps can be obtained by the depth map component 106 by using a depth estimation method such as the one with little to no regularization, for example the one described by Kim et al., which is incorporated by reference in its entirety here, to reconstruct as much detail as possible.

The point geometric consistency determination component 108 can be configured to determine, for each point p projected from a given depth map in a collection, geometric consistency with other views indicated by other depth maps in the collection. This may involve how far p is from the true surface by estimating and examining the signed distances of p to the range surfaces entailed by the input depth maps. In some implementations, the geometric consistency determination performed by the point geometric consistency determination component 108 for each p may include tessellating and back-projecting the depth maps in the collection to obtain triangulated range surfaces. In some implementations, the point geometric consistency component 108 may be configured to calculate the distance along a viewing ray from the camera center $V_i$ to point p. In some implementation, the distance calculated by the point geometric consistency component 108 can include a signed distance $d_i(p)$ between p and the range surface of depth map $D_i$ by the z-distance between p and the intersection point in camera space. In some implementations, geometric consistency component 108 can be configured to compute a weight $w_i$ to account for when a point p from the range image $D_i$ has been observed at a grazing angle to the surface. The weight $w_i$ can measure a similarity between the viewing direction $p-V_i$ and the normal direction n at p and thus becomes small in absolute value at a grazing angle.

The point photo-consistency determination component 110 can be configured to determine photo-consistency (e.g., color) of each point p with a range surface indicated by a given depth map in the collection. Photo-consistency of a point is well understood in the art. In short, a point p may be determined by the point photo-consistency determination component 110 to be photo-consistent with a set of depth maps if, for each depth maps in which that point p is visible, the image irradiance of that point is similar to the intensity at the corresponding image pixel, e.g., the point where p intersects with depth map. In some implementations, point photo-consistency determination component 110 may be configured to estimate a color consistency between a range surface that is close to p.

The point visibility determination component 112 can be configured to determine a visibility value for each p with respect to range surfaces indicated by the depth maps in the collection. In some implementations, this may involve counting the depth maps that fall into a margin and thus contribute to the color consistency calculation by the point photo-consistency determination component 110. The visibility value determination for each p as performed by the point visibility determination component 112 can provide an estimate of the number of depth maps in which p is visible.

The point filtering component 114 can be configured to determine, for each p, whether p should be kept based on its geometric and photometric consistency as determined by the geometric consistency component 108 and point photo-consistency determination component 110, respectively. This may involve comparing the distance value determined for p by the geometric consistency component 108 with one or more threshold distance values such that when the determined distance value for p falls within the threshold distance value(s), p can be considered as a candidate to be kept by the point filtering component 114. Similarly, the point filtering component 114 can be configured to compare the photo-consistency value determined for p by the point photo-consistency determination component 110 with one or more threshold photo-consistency values such that when the determined photo-consistency value for p falls within the threshold photo-consistency value(s), p can be considered as a candidate to be kept by the point filtering component 114. In some embodiments, operations by the point filtering component 114 can include determining visibility of the points with respect to a surface of the 3D model. In those embodiments, the point filtering component 114 can be configured to determine whether to keep the points based on the visibility of points. In one embodiments, the point filtering component 114 can be configured to determine the photo-consistency value of the points based on the visibility of the points.

The 3D model reconstruction component 116 can be configured to construct or reconstruct a 3D model using points p that are kept by point filtering component 114. The 3D reconstruction performed by 3D model reconstruction component 116 may employ any image-based technique that reconstructs scene geometry in the form of depth maps and any surface reconstruction technique that takes a point set as input. Examples of some of the 3D reconstruction techniques can include techniques proposed by Calakli, et al., Collins, Fuhrmann, et al., Fuhrmann, Kazhdan, et al., Kim, Ummenhofer, et al., Zhang, all of which are incorporated by reference in their entirety herein.

Figure 2:
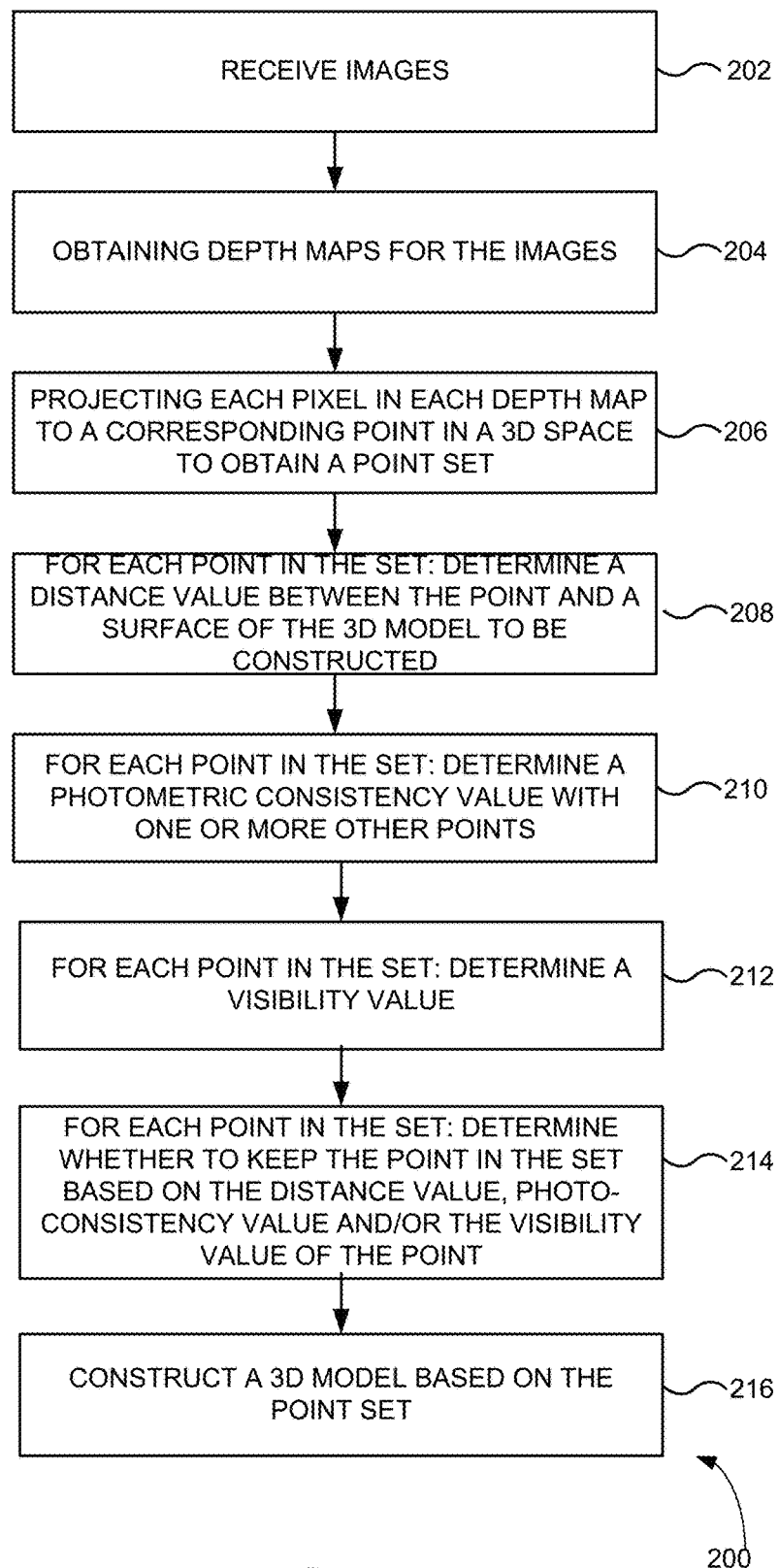
FIG. 2 illustrates an exemplary method for providing enhanced removing of noise and outliers from point sets generated by image-based 3D reconstruction techniques in accordance with the disclosure.

With an example of system 100 for providing enhanced removing of noise and outliers from point sets generated by image-based 3D reconstruction techniques having been generally described, attention is now directed to FIG. 2, where an exemplary method for providing enhanced removing of noise and outliers from point sets generated by image-based 3D reconstruction techniques is described. The method presented in FIG. 2 and described below is intended to be illustrative and non-limiting. The particular series of processing steps depicted in FIG. 2 is not intended to be limiting. It is appreciated that the processing steps may be performed in an order different from that depicted in FIG. 2 and that not all the steps depicted in FIG. 2 need be performed. In certain implementations, the method 200 may be implemented by a computer system, such as the system 100 shown in FIG. 1.

In some embodiments, the method depicted in method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At 202, a collection of 2D images of an object may be received. As mentioned above, the images received at 202 may capture the object from different viewpoints to form multiple views of the scene. FIG. 3 illustrates one example of capturing 2D images of an object 300 from different viewpoints 302. In the example shown in FIG. 3, the images of the object 300 are captured from viewpoints 302*a-d*, where the cameras are placed. In some implementations, operations involved in 202 may be implemented by an image component the same as or substantially similar to the image component 104 illustrated and described herein.

At 204, depth maps for the images received at 202 can be obtained. For example, as described above, a given depth map obtained at 204 for a corresponding image of the object at a particular viewpoint can contain information relating to the distance of the surfaces of the object from the particular viewpoint as captured in the corresponding image. In some implementations, operations involved in 204 may be implemented by a depth map component the same as or substantially similar to the depth map component 106 illustrated and described herein.

At 206, each pixel in each depth map obtained at 206 can be projected to a corresponding point in a 3D space. At 206, all of the pixels in the depth maps are projected into the 3D space to obtain a point cloud or a point set. There might be redundancy in the point set obtained at 206 such that certain points in the cloud may be projected from different depth maps multiple times. In some implementations, operations involved in 206 may be implemented by a depth map component the same as or substantially similar to the depth map component 106 illustrated and described herein.

Figure 4:
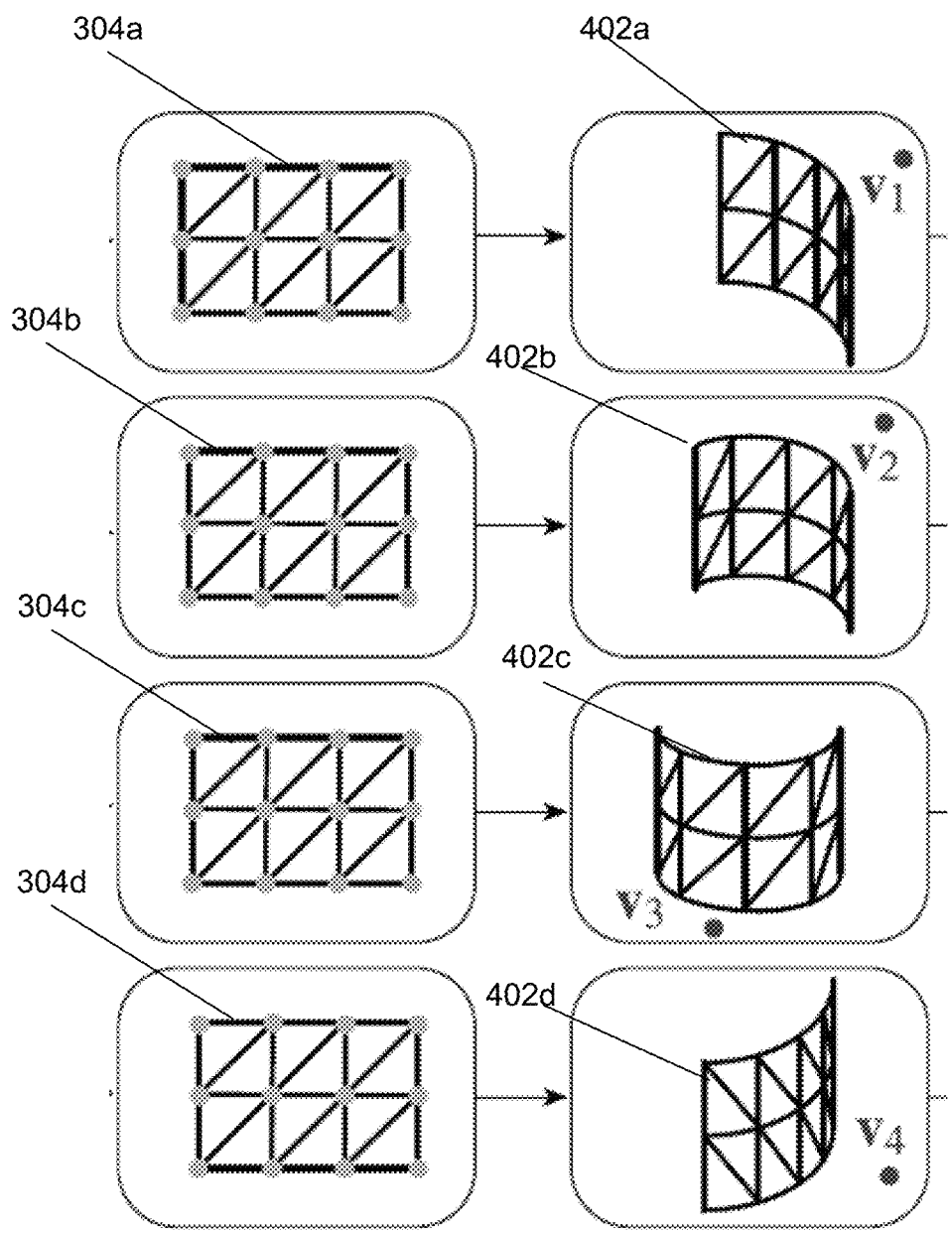
FIG. 4 illustrates the depths maps are projected in a 3D space to obtain corresponding range surfaces of the 3D model.

At 208, for each point p in the point set obtained at 206, a distance value is determined between the point p and a surface of the 3D model constructed from the images obtained at 202. This distance value is to measure how far p is from such a surface to determine whether p is geometrically consistent with the surface. In some implementations, the distance value determination at 208 can include estimating and examining the signed distance of p to one or more range surfaces entailed by the input depth maps obtained at 204. In some implementations, for calculating the singed distance, 208 may include triangulating the depth maps obtained at 204 to obtain the range surfaces. FIG. 3 illustrates that the depth maps $D_1$-$D_i$ obtained for each image taken at viewpoints 302a-d respectively are triangulated, where i can be any arbitrary number that is greater than 1. FIG. 4 illustrates the depths maps $D_1$-$D_i$ are projected in a 3D space to obtain corresponding range surfaces 404a-b. It should be understood although only four depth maps, i.e., $D_1$-$D_4$ are illustrated in various figures herein. This not intended to be limiting. There can be more or less than four depth maps in embodiments in accordance with the disclosure. In some implementations, during the triangulation of the depth maps, the Ill-shaped triangles having an angle less than a threshold (1° in one implementation) can be removed to permit opening concavities over depth discontinuities.

Figure 5:
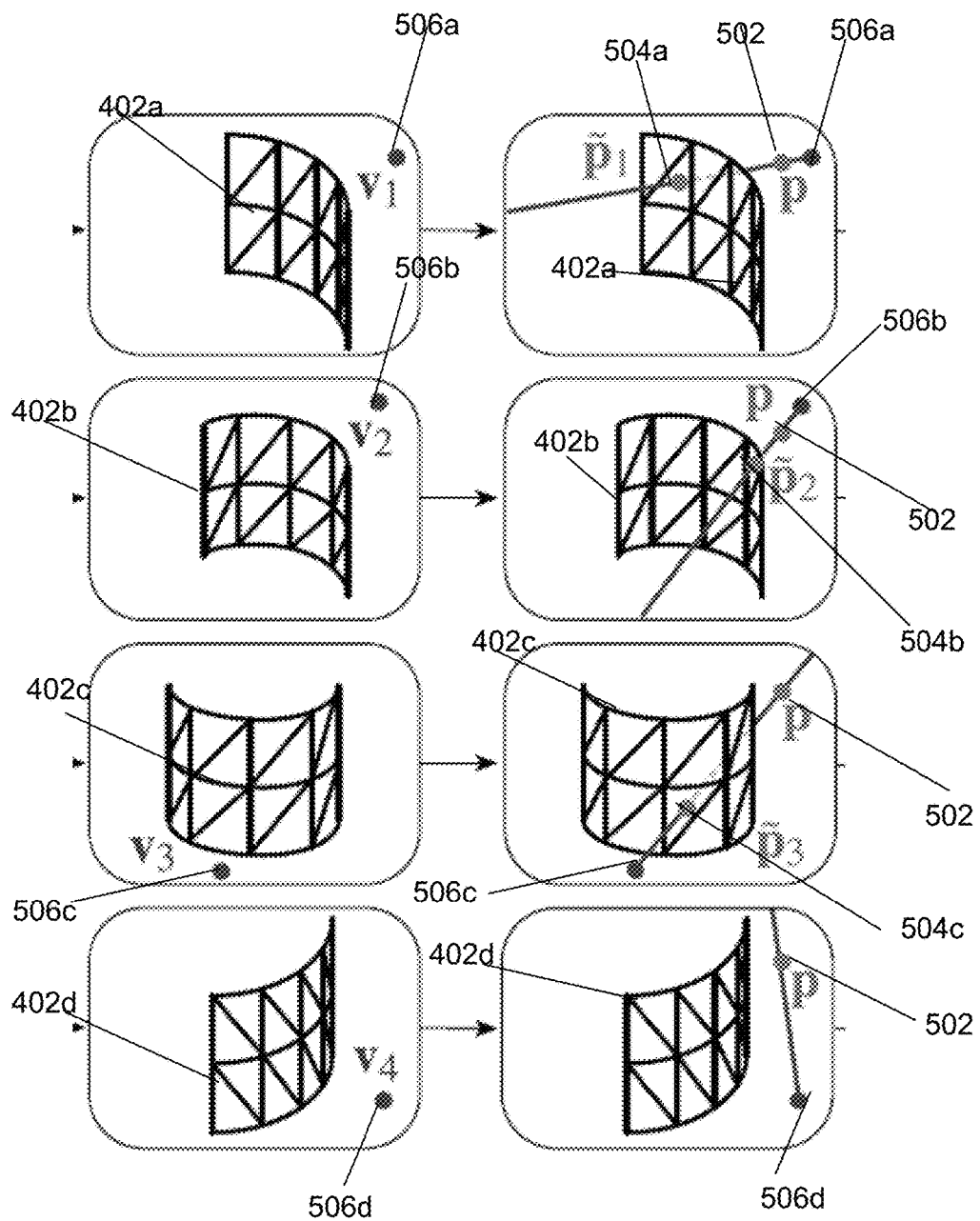
FIG. 5 conceptually illustrates for each point p originated from a depth map, intersection points $\tilde{p}_i$ with all other depth maps can be calculated.

FIG. 5 conceptually illustrates for each point p originated from a depth map, intersection points $\tilde{p}_i$ with all other depth maps can be calculated. In this example, a given point p 502 in the point set obtained at 206 is shown. Also shown is that, for each depth map $D_i$ obtained at 206, other than the depth map where p originates, a ray connecting p 502 and a corresponding viewpoint $V_i$ 506 associated with depth map $D_i$ can be intersected with a range surface indicated by $D_i$. As shown in this example, for the depth map $D_1$, p 502 can be intersected with range surface 402a through a ray connecting p 502 and the viewpoint 506a associated with $D_1$ at point $\tilde{p}_1$. The same is shown such that p 502 is also intersected with range surface 402b indicated by depth map $D_2$ at point $\tilde{p}_2$, and with range surface 402c indicated by depth map $D_3$ at point $\tilde{p}_3$. However, as also shown, p 502 does not intersect with range surface 402d indicated by depth map $D_4$ at point $\tilde{p}_4$. Based on these intersections, geometric consistency of p 502 can be examined, for example through computing the distance value that measures how far is p away from the range surfaces.

It should be noted that computing the distance from point p 502 to the range surfaces, such as 402a-d, may involve building spatial acceleration structures and multiple point-to-triangle projections in some embodiments, which can be computationally expensive. In some implementations, instead of computing the exact point-mesh distance, a distance along the viewing ray from the camera center $V_i$ 506 to point p 502 can be calculated, which may involve intersecting the ray with the triangulated range surfaces as shown in FIG. 5. However, since the range surfaces, such as 402a-d, are simply the back-projection of the depth map $D_i$, the intersection can be efficiently calculated in those implementations at 208 by projecting p 502 to the image space of $D_i$. Moreover, the vertices of the 2D triangle in the tessellated depth map into which p 502 was projected also correspond to the vertices of the intersected triangle in 3D. Accordingly, the depth at the intersection point $\tilde{p}_i$, such as 504a-c, can be interpolated barycentrically from the three vertices. In some implementations, the signed distance $d_i(p)$ between p 502 and the range surface of depth map $D_i$ by the z-distance between p and the intersection point $\tilde{p}_i$ in camera space can be calculated using the following equation:

$$d_i(p) = Z_i(p) - z \quad (1)$$

where z is the depth (z-coordinate) of p 502 and $Z_i(p)$ is the interpolated depth at the intersection.

It should be understood, when considering the distance of p 502 to a range surface indicated by $D_i$, a negative distance $d_i$ may imply that p 502 lies behind the range surface and could not have been observed from the view point associated with $D_i$. In some implementations, such negative $d_i$ can be discarded when computing the distance value, for example when the distance value is computed through weighted averaging all of the distances at which p 502 intersects with the range surfaces. In some implementations, allowing for a certain error margin, an indicator function can be defined to specify whether a point lies no farther than a certain distance δ behind the surface as follows:

$$\mathbb{1}_\sigma^G(d_i) = \begin{cases} 1 & \text{if } -\sigma < d_i \\ 0 & \text{otherwise} \end{cases}. \quad (2)$$

A large positive distance $d_i$ may imply that p 502 could have been seen from this view but is far away from the actually observed range surface. Through equation 2, for limiting the influence of these outliers, the signed distance $d_i$ is truncated to s if $d_i > s$, but still include it in the computation of the distance value calculation since it has been seen from this view and makes the distance computation more robust against cases where p is an outlier (instead of a depth value (p)). In cases where no intersection exists, e.g., $D_4$ in FIG. 6, the range surface is not further considered for the distance calculation for p 502.

In some implementations, a grazing angle from which p 502 is viewed with respect to $D_i$ can be considered to reflect greater uncertainty when point p 502 from the range image $D_i$ has been observed at the grazing angle to the surface. In those implementations, the following weight $w_i$ can be used:

$$w_i(p) = n(p)^T \frac{p - v_i}{\|p - v_i\|}, \quad (3)$$

where n(p) is the point normal at p. The weight $w_i$ measures the similarity between the viewing direction p-vi and the normal direction n at p and thus becomes small in absolute value at a grazing angle. Point normals can be calculated using principal component analysis of their image-space neighbors, for example, as described by Hoppe et al, which are incorporated by reference in its entirety, and are oriented towards the camera center, hence $w_i(p)>0$.

It should be noted depth maps from opposite sides of the object do only overlap in small regions, usually at grazing angles, which makes these observations unreliable without contributing much to the overall distance estimate. For significantly decreasing computation time, depth maps whose viewing direction $v_j$ differs too much from the viewing direction $v_i$ under which p was observed may not considered by limiting the angle between both viewing directions. In some implementations, only depth maps for an angle smaller than 90°, i.e., $V_j^T v_i > 0$ are kept to yield good results in those implementations.

In some implementations, the determination of the distance value between p 502 and the surface of the 3D model can include computing the signed distance d to the surface as a weighted average over all range surfaces using the following equation:

$$d(p) = \frac{1}{w(p)} \sum_i \mathbb{I}_\sigma^G(d_i(p)) w_i(p) \min\{d_i(p), \sigma\}. \quad (4)$$

In those implementations, the weight $w_i$ is calculated only at vertices of the range image and interpolated in the same manner as for the signed distance in equation 1 described above. The normalization factor $w(p)$ is the summation of all weights: $w(p) = \Sigma_i \mathbb{I}_\sigma^G(d_i(p)) w_i(p)$. It should be noted that p 502 itself and its weight are included in the average, with the distance of 0 to the range surface it originates from, since the purpose is to compute the distance to an averaged surface from all depth maps. Other methods for computing the distance value between p 502 and the surface of the 3D model to be constructed are contemplated. In some implementations, operations involved in 208 can be performed by a geometric consistency component the same as or substantially similar to the geometric consistency component 108 described and illustrated herein.

At 210, for each point p in the point set obtained at 206, a photometric consistency value can be determined. That is, at 210, in addition to the geometric consistency for the point p 502 determined at 208, the consistency of colors of the intersection points $\tilde{p}_i$ corresponding to p 502 can be calculated. It should be noted, in some implementations, different from the distance value calculation described above, where outliers may be truncated, when calculating the photometric consistency value, only the range surfaces that lie close to the point p 502 may be considered, as only they provide reliable color estimates. In those implementations, a second indicator function, similar to equation 2 above, can be defined to encode whether the point p 502 is closer to the range surface than the distance δ for both positive and negative directions as follows:

$$\mathbb{I}_\sigma^P(d_i) = \begin{cases} 1 & \text{if } -\sigma < d_i < \sigma \\ 0 & \text{otherwise} \end{cases} \quad (5)$$

It should be noted in some implementations, a same δ can be used for equation 2 and 5. In some implementations, operations 210 can include determining photometric consistency using a standard deviation of the color distribution using the following formula:

$$p(p) = \left( \frac{1}{v(p)} \sum_i \mathbb{I}_\sigma^P(d_i(p)) \|c_i(p)\|^2 - \frac{1}{v(p)^2} \left\| \sum_i \mathbb{I}_\sigma^P(d_i(p)) c_i(p) \right\|^2 \right)^{1/2}, | \quad (7)$$

where $c_i$ denotes the (interpolated) color value at the intersection of p 502 and the range surface indicated by depth map Di. In some implementations, operations involved in 210 can be performed by a point photo-consistency determination component the same as or substantially similar to the point photo-consistency determination component 110 described and illustrated herein.

At 212, for each point p in the point set obtained at 206, a visibility value can be calculated. In some implementations, operations involved in 212 can include determining visibility value by counting the depth maps that fall into the margin indicated by equation 5 as they contribute to the color consistency calculation as follows:

$$v(p) = \sum_i \mathbb{I}_\sigma^P(d_i(p)), | \quad (6)$$

which provides an estimate of the number of depth maps in which p is visible. As shown above, equation 6 can also be implemented at 210 through equation 7 for determining the photometric consistency value of the point p. In some implementations, operations involved in 212 can be performed by a point visibility determination component the same as or substantially similar to the point visibility determination component 112 described and illustrated herein.

At 214, for each point in the point set obtained at 206, whether the point can be kept in the set can be determined based on the distance value, photometric consistency value, and/or the visibility value determined at 208, 210, and 212, respectively. For this determination, operations involved in 214 may include implementing the following conditions:

$$-t_d < d(p) < 0, \quad (8)$$

$$p(p) < t_p, \quad (9)$$

$$v(p) > t_v, \quad (10)$$

where $t_d < \delta$, $t_p$, and $t_v$ are thresholds for distance, photometric consistency, and visibility, respectively. It is noted that δ can influence the possible thickness of reconstructed features of the object, $t_d$ can decide how much deviation from the surface we allow and thus controls the level of removed noise. It is also noted that a small value of $t_d$ can reduce the number of retained points significantly and results in smoother mesh reconstructions from the filtered point set. When the input depth maps are already sparse, a higher value can be chosen. In some implementations, choosing $t_d$ as a fixed ratio of δ (e.g. $t_d = 0.1 \cdot \delta$ in some examples) and only adjusting δ to the object scale works well. The determination at 214 can include keeping only points with a negative signed distance to the surface (equation 8) can based on the observation that most of the noise appears on the "outside" of the surface, which can be attributed to the image-based capturing process. Retaining points only on the inside can remove such noise.

Figure 6:
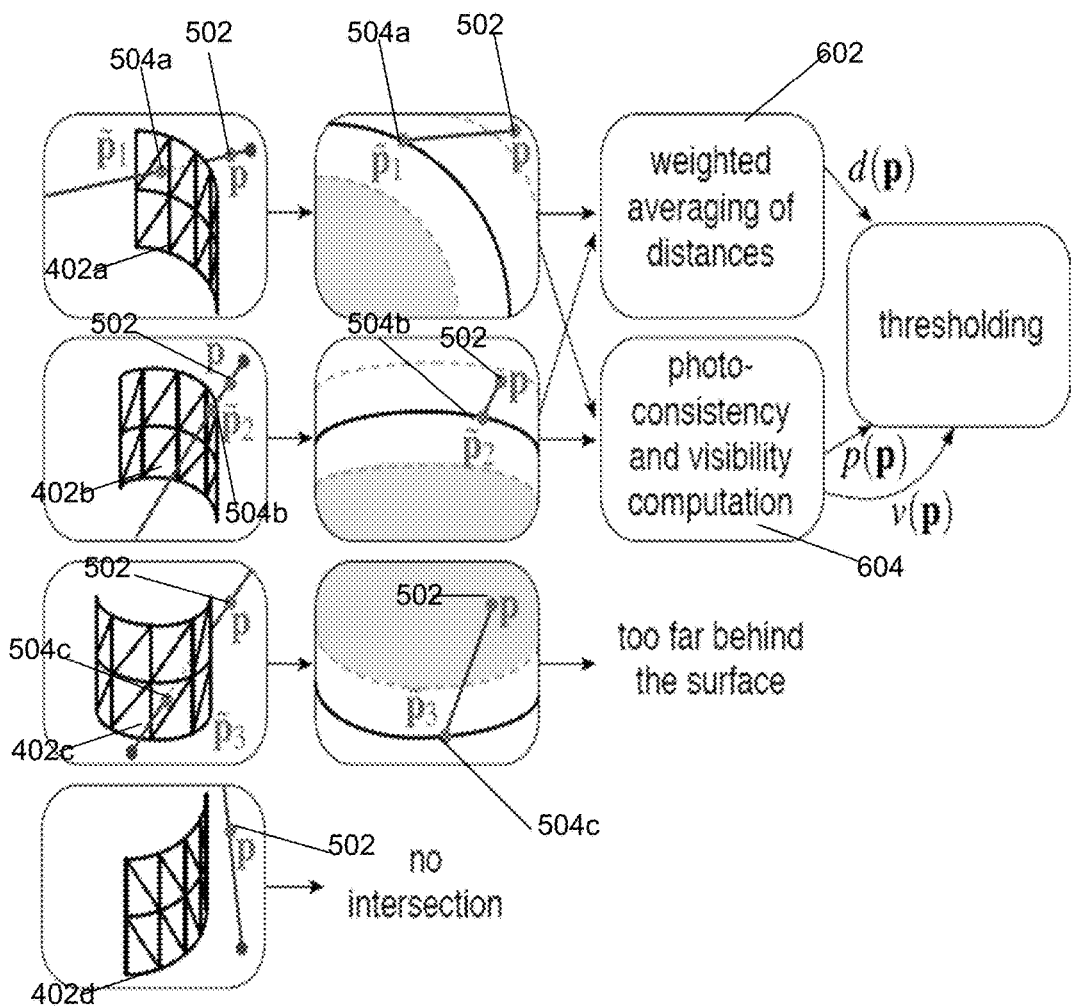
FIG. 6 illustrates one example of filtering points in a point set based on the geometric consistency value, photo-metric consistency value, and/or the visibility value.

FIG. 6 illustrates one example of filtering points in the point set obtained at 206 based on the geometric consistency value, photo-metric consistency value, and/or the visibility value. As shown, color, depth and weight values described above and herein can be determined at the triangle vertices in the depth map $D_i$ and can be interpolated for the intersection points $\tilde{p}_i$, such as 504a-c. In some implementations, the signed distances between p 502 and the intersection points $\tilde{p}_i$, such as 504a-c, can be approximated as described above to determine how far p 502 is from the range surfaces corresponding to $\tilde{p}_i$. As shown, only range surfaces for which p 502 does not lie too far behind the surface can be considered for the filtering. As illustration, in the example shown, p 502 lies far too behind from range surface 402c; and does not intersect with range surface 402d. Thus, range surfaces 402c and 402d may not be considered for the filtering. On the other hand, as shown, p 502 lies close to range surfaces 402a and 402b, and thus those range surfaces can be considered for the filtering. As shown, a weighted average function 602, for example equation 4 described above, can be used to calculate the average signed distances d(p) with respect to the range surfaces that are considered (range surfaces 402a and 402b in this example). As also shown, a photo-consistency measure p(p), for example equation 7 described above, and visibility measure v(p), for example equation 6 described above, can be used to determine the photometric consistency and visibility value for p 502. Likewise, in this example, only range surfaces 402a and 402b are considered for the photo-consistency and visibility determinations. As still shown, all three values can be used to decide whether p 502 should be kept in the point set, for example in accordance with the conditions 8, 9, 10 described above.

In some implementations, operations involved in 214 can be performed by a point filtering component the same as or substantially similar to the point filtering component 114 described and illustrated herein.

At 216, the 3D model can be reconstructed based on the point set filtered at 214. In some implementations, operations involved in 216 can be performed by a 3D model reconstruction component the same as or substantially similar to the 3D model reconstruction component 116 described and illustrated herein.

FIG. 9 provides some exemplary pseudo codes for implementing method 200 described and illustrated herein. It has been shown as the complexity increases quadratically with the number of input depth maps N, the algorithm employed in method 200 can process large datasets since it does not perform costly optimizations and require much additional space except for the points set itself. Accordingly, computer performance is improved. It should be understood the pseudo codes below are meant to be illustrative and thus not intended to be limiting. Other ways of implementing method 200 in accordance with the disclosure are contemplated.

Figure 7:
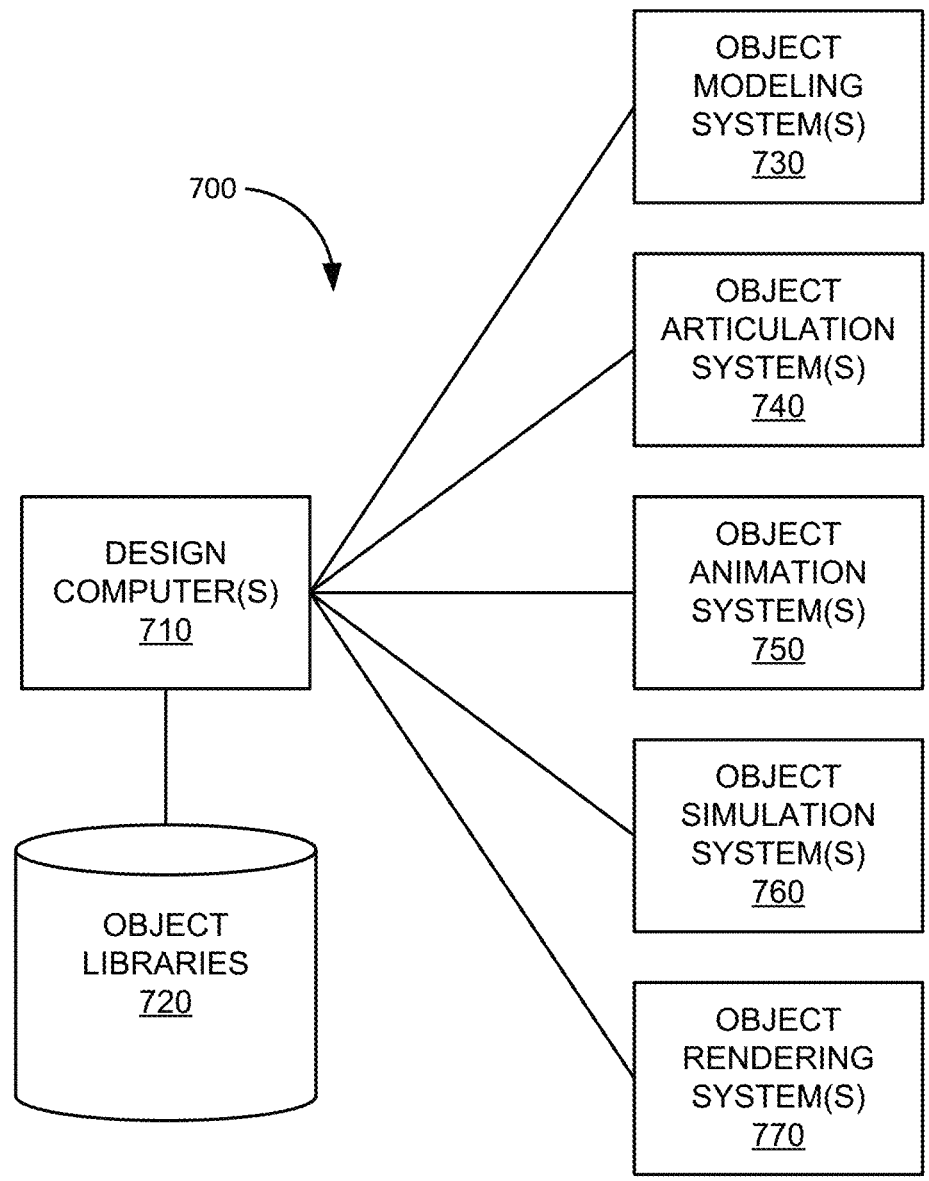
FIG. 7 is a simplified block diagram of system for creating computer graphics imagery (CGI) and computer-aided animation that may implement or incorporate various embodiments.

FIG. 7 is a simplified block diagram of system 700 for creating computer graphics imagery (CGI) and computer-aided animation that may implement or incorporate various embodiments. In this example, system 700 can include one or more design computers 710, object library 720, one or more object modeler systems 730, one or more object articulation systems 740, one or more object animation systems 750, one or more object simulation systems 760, and one or more object rendering systems 780. Any of the systems 730-780 may be invoked by or used directly by a user of the one or more design computers 710 and/or automatically invoked by or used by one or more processes associated with the one or more design computers 710. Any of the elements of system 700 can include hardware and/or software elements configured for specific functions.

The one or more design computers 710 can include hardware and software elements configured for designing CGI and assisting with computer-aided animation. Each of the one or more design computers 710 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 710 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 710 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 710 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 710 acting as an animator may employ one or more systems or tools to specify motion and position of one or more objects over time to produce an animation.

Object library 720 can include elements configured for storing and accessing information related to objects used by the one or more design computers 710 during the various stages of a production process to produce CGI and animation. Some examples of object library 720 can include a file, a database, or other storage devices and mechanisms. Object library 720 may be locally accessible to the one or more design computers 710 or hosted by one or more external computer systems.

Some examples of information stored in object library 720 can include an object itself, metadata, object geometry, object topology, rigging, control data, animation data, animation cues, simulation data, texture data, lighting data, shader code, or the like. An object stored in object library 720 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 730 can include hardware and/or software elements configured for modeling one or more objects. Modeling can include the creating, sculpting, and editing of an object. In various embodiments, the one or more object modeling systems 730 may be configured to generated a model to include a description of the shape of an object. The one or more object modeling systems 730 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 730 may further generate model data (e.g., 2D and 3D model data) for use by other elements of system 700 or that can be stored in object library 720. The one or more object modeling systems 730 may be configured to allow a user to associate additional information, metadata, color, lighting, rigging, controls, or the like, with all or a portion of the generated model data.

The one or more object articulation systems 740 can include hardware and/or software elements configured to articulating one or more computer-generated objects. Articulation can include the building or creation of rigs, the rigging of an object, and the editing of rigging. In various embodiments, the one or more articulation systems 740 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 740 may further generate articulation data (e.g., data associated with controls or animations variables) for use by other elements of system 700 or that can be stored in object library 720. The one or more object articulation systems 740 may be configured to allow a user to associate additional information, metadata, color, lighting, rigging, controls, or the like, with all or a portion of the generated articulation data.

The one or more object animation systems 750 can include hardware and/or software elements configured for animating one or more computer-generated objects. Animation can include the specification of motion and position of an object over time. The one or more object animation systems 750 may be invoked by or used directly by a user of the one or more design computers 710 and/or automatically invoked by or used by one or more processes associated with the one or more design computers 710.

In various embodiments, the one or more animation systems 750 may be configured to enable users to manipulate controls or animation variables or utilized character rigging to specify one or more key frames of animation sequence. The one or more animation systems 750 generate intermediary frames based on the one or more key frames. In some embodiments, the one or more animation systems 750 may be configured to enable users to specify animation cues, paths, or the like according to one or more predefined sequences. The one or more animation systems 750 generate frames of the animation based on the animation cues or paths. In further embodiments, the one or more animation systems 750 may be configured to enable users to define animations using one or more animation languages, morphs, deformations, or the like.

The one or more object animations systems 750 may further generate animation data (e.g., inputs associated with controls or animations variables) for use by other elements of system 700 or that can be stored in object library 720. The one or more object animations systems 750 may be configured to allow a user to associate additional information, metadata, color, lighting, rigging, controls, or the like, with all or a portion of the generated animation data.

The one or more object simulation systems 760 can include hardware and/or software elements configured for simulating one or more computer-generated objects. Simulation can include determining motion and position of an object over time in response to one or more simulated forces or conditions. The one or more object simulation systems 760 may be invoked by or used directly by a user of the one or more design computers 710 and/or automatically invoked by or used by one or more processes associated with the one or more design computers 710.

In various embodiments, the one or more object simulation systems 760 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 760 may be used to simulate the behavior of objects, such as hair, fur, and cloth, in response to a physics model and/or animation of one or more characters and objects within a computer-generated scene.

The one or more object simulation systems 760 may further generate simulation data (e.g., motion and position of an object over time) for use by other elements of system 100 or that can be stored in object library 720. The generated simulation data may be combined with or used in addition to animation data generated by the one or more object animation systems 750. The one or more object simulation systems 760 may be configured to allow a user to associate additional information, metadata, color, lighting, rigging, controls, or the like, with all or a portion of the generated simulation data.

The one or more object rendering systems 780 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 780 may be invoked by or used directly by a user of the one or more design computers 710 and/or automatically invoked by or used by one or more processes associated with the one or more design computers 710. One example of a software program embodied as the one or more object rendering systems 780 can include PhotoRealistic RenderMan, or PRMan, produced by Pixar Animations Studios of Emeryville, Calif.

In various embodiments, the one or more object rendering systems 780 can be configured to render one or more objects to produce one or more computer-generated images or a set of images over time that provide an animation. The one or more object rendering systems 780 may generate digital images or raster graphics images.

In various embodiments, a rendered image can be understood in terms of a number of visible features. Some examples of visible features that may be considered by the one or more object rendering systems 780 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 780 may further render images (e.g., motion and position of an object over time) for use by other elements of system 700 or that can be stored in object library 720. The one or more object rendering systems 780 may be configured to allow a user to associate additional information or metadata with all or a portion of the rendered image.

Figure 8:
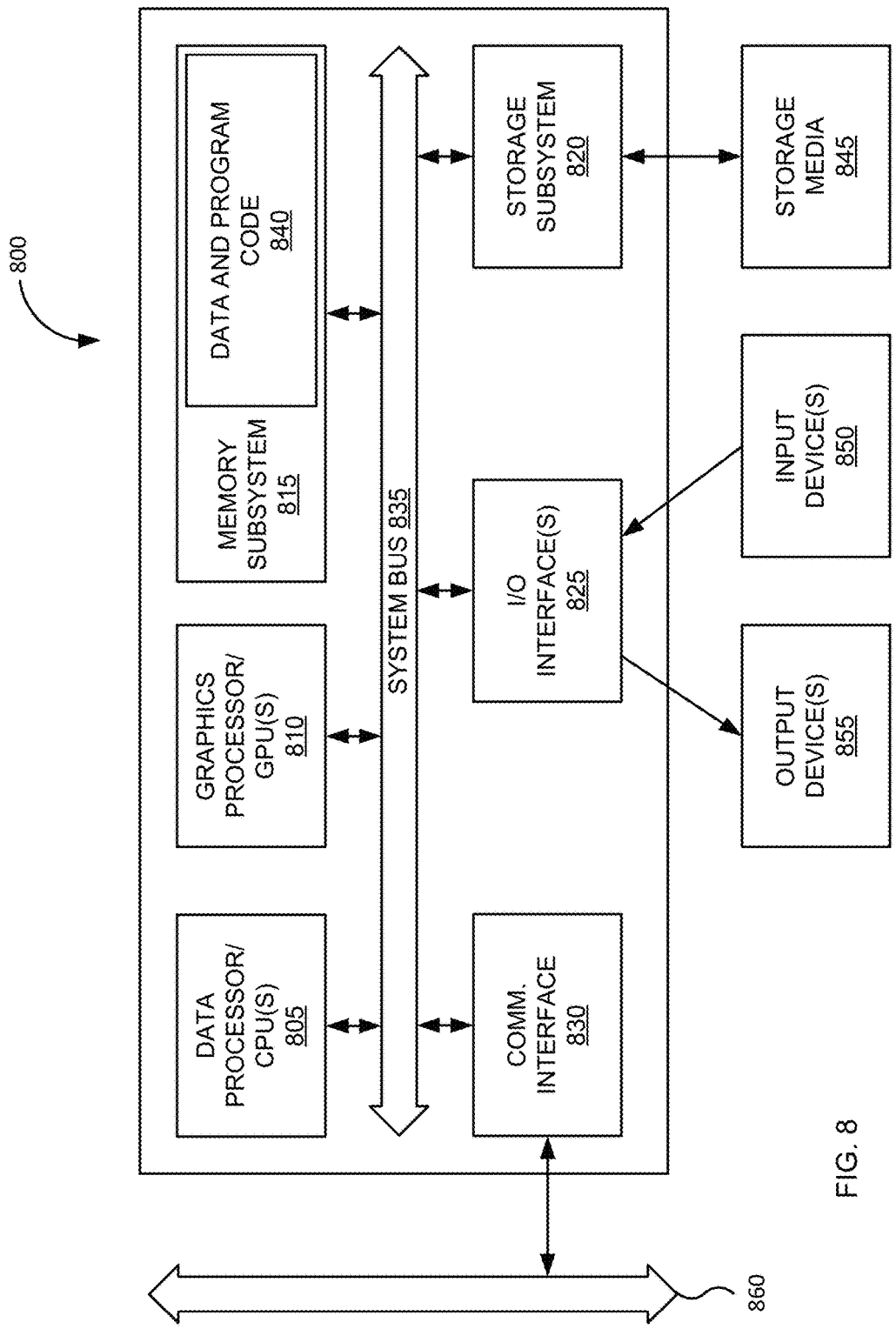
FIG. 8 is a block diagram of computer system that can be used to implement various embodiments described and illustrated herein.

FIG. 8 is a block diagram of computer system 800 that can be used to implement various embodiments described and illustrated herein. FIG. 8 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 800 and any of its components or subsystems can include hardware and/or software elements configured for performing methods described herein.

Computer system 800 may include familiar computer components, such as one or more one or more data processors or central processing units (CPUs) 805, one or more graphics processors or graphical processing units (GPUs) 810, memory subsystem 815, storage subsystem 820, one or more input/output (I/O) interfaces 825, communications interface 830, or the like. Computer system 800 can include system bus 835 interconnecting the above components and providing functionality, such connectivity and inter-device communication.

The one or more data processors or central processing units (CPUs) 805 can execute logic or program code or for providing application-specific functionality. Some examples of CPU(s) 805 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 810 can execute logic or program code associated with graphics or for providing graphics-specific functionality. GPUs 810 may include any conventional graphics processing unit, such as those provided by conventional video cards. In various embodiments, GPUs 810 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 810 may include any number of registers, logic units, arithmetic units, caches, memory interfaces, or the like.

Memory subsystem 815 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 815 can include data and program code 840.

Storage subsystem 820 can also store information using machine-readable articles, information storage devices, or computer-readable storage media. Storage subsystem 820 may store information using storage media 845. Some examples of storage media 845 used by storage subsystem 820 can include floppy disks, hard disks, optical storage media such as CD-ROMS, DVDs and bar codes, removable storage devices, networked storage devices, or the like. In some embodiments, all or part of data and program code 840 may be stored using storage subsystem 820.

The one or more input/output (I/O) interfaces 825 can perform I/O operations. One or more input devices 850 and/or one or more output devices 855 may be communicatively coupled to the one or more I/O interfaces 825. The one or more input devices 850 can receive information from one or more sources for computer system 800. Some examples of the one or more input devices 850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 850 may allow a user of computer system 800 to interact with one or more non-graphical or graphical user interfaces to enter a comment, select objects, icons, text, user interface widgets, or other user interface elements that appear on a monitor/display device via a command, a click of a button, or the like.

The one or more output devices 855 can output information to one or more destinations for computer system 800. Some examples of the one or more output devices 855 can include a printer, a fax, a feedback device for a mouse or joystick, external storage systems, a monitor or other display device, a communications interface appropriately configured as a transceiver, or the like. The one or more output devices 855 may allow a user of computer system 800 to view objects, icons, text, user interface widgets, or other user interface elements. A display device or monitor may be used with computer system 800 and can include hardware and/or software elements configured for displaying information.

Communications interface 830 can perform communications operations, including sending and receiving data. Some examples of communications interface 830 may include a network communications interface (e.g. Ethernet, Wi-Fi, etc.). For example, communications interface 830 may be coupled to communications network/external bus 860, such as a computer network, a USB hub, or the like. A computer system can include a plurality of the same components or subsystems, e.g., connected together by communications interface 830 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 800 may also include one or more applications (e.g., software components or functions) to be executed by a processor to execute, perform, or otherwise implement techniques disclosed herein. These applications may be embodied as data and program code 840. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 815 and/or storage subsystem 820.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for reconstructing a three-dimensional (3D) model of an object, the method being performed by a computer system and comprising:

receiving images of the object, the images capturing the object from different viewpoints;

obtaining a depth map for each of the images, the depth map including information relating to a surface of the object in the 3D space;

projecting each pixel in each depth map into a 3D space to obtain a point set;

for each point in the point set, determining whether the point is consistent with the surface of the object in the 3D space as indicated by a set of depth maps for the images, wherein the set of depth maps does not include the depth map from which the point is projected, wherein the consistency determination includes:

for each depth map in the set:

performing an intersection of a ray with the surface of the object indicated by the depth map to find an intersection point, the ray being through a camera viewpoint corresponding to the depth map, and the point; and in response to the intersection point being found, determining a distance between the point and intersection point as a distance between the point and the surface of the object as seen from the camera viewpoint corresponding to the depth map;

determining whether the point is geometrically consistent with the surface of the object based on one or more of the determined distances between the point and the surface of the object; and determining whether to discard the point from point set based on the determination whether the point is geometrically consistent with the surface of the object; and reconstructing the 3D model using the point set.

2. The method of claim 1, wherein the determination whether the point is geometrically consistent with the surface of the object based on one or more of the determined distances between the point and the surface of the object includes:

averaging distances between the point and the surface of the object as indicated by the set of depth maps to obtain an average distance between the point and the surface of the object.

3. The method of claim 2, wherein the determination whether the point is geometrically consistent with the surface of the object is further based on a threshold distance value such that the point is determined to be geometrically consistent when the average distance between the point and the surface of the object is less than or equal to the threshold distance value.

4. The method of claim 1, wherein whether the point is geometrically consistent with the surface of the object based on one or more of the determined distances between the point and the surface of the object includes:
truncating any distance between the point and the surface as indicated by a given depth map in the set to a preset value when the distance exceeds a threshold value.

5. The method of claim 1, wherein determining whether the point is geometrically consistent with the surface of the object based on one or more of the determined distances between the point and the surface of the object includes:
assigning a weight to each of the determined distances, and determining the distance between the point and the surface of the object based on the weighted distances.

6. The method of claim 1, wherein determining whether the point is geometrically consistent with the surface of the object based on one or more of the determined distances between the point and the surface of the object includes:
determining whether any distance between the point and the surface as indicated by a given depth map in the set is smaller than a threshold value indicating a negative distance value, and in response to determining the distance is smaller than the threshold value, excluding such a distance from the determination whether the point is geometrically consistent with the surface of the object.

7. The method of claim 1, further comprising: for each point in the point set, determining whether the point is photometrically consistent with the surface of the object based on the intersection points found; and, wherein
the determination whether to discard the point from the point set is further based on whether the point is photometrically consistent the surface of the object.

8. The method of claim 7, wherein determining whether the point is photometrically consistent with the surface of the object based on the intersection points found includes:
for each intersection point found: determining whether the distance between the point and intersection point is larger than a threshold value; and
in response to determining the distance between the point and intersection point is larger than the threshold value, excluding the intersection point from the determination whether the point is photometrically consistent with the surface of the object.

9. The method of claim 7, further comprising: for each point in the point set, determining whether the point is visible with respect to each of the depth maps in the set; and, wherein
the determination whether the point is photometrically consistent with the surface of the object is further based on whether the point is visible with respect to each of the depth maps in the set.

10. The method of claim 7, wherein the determination whether the point is photometrically consistent with the surface of the object based on the intersection points found is based on a standard deviation between the color values of the point and the intersection points.

11. A system for reconstructing a three-dimensional (3D) model of an object, the system comprising one or more of a processor configured to execute machine-readable instructions such that when the machine-readable instructions are executed by the processor, the processor is caused to perform:
receiving images of the object, the images capturing the object from different viewpoints;
obtaining a depth map for each of the images, the depth map including information relating to a surface of the object in the 3D space;
projecting each pixel point in each depth map into a 3D space to obtain a point set;
for each point in the point set, determining whether the point is consistent with the surface of the object in the 3D space as indicated by a set of depth maps for the images, wherein the set of depth maps does not include the depth map from which the point is projected, wherein the consistency determination includes:
for each depth map in the set:
performing an intersection of a ray with the surface of the object indicated by the depth map to find an intersection point, the ray being through a camera viewpoint corresponding to the depth map, and the point; and
in response to the intersection point being found, determining a distance between the point and intersection point as a distance between the point and the surface of the object as seen from the camera viewpoint corresponding to the depth map;
determining whether the point is geometrically consistent with the surface of the object based on one or more of the determined distances between the point and the surface of the object; and
determining whether to discard the point from point set based on the determination whether the point is geometrically consistent with the surface of the object; and
reconstructing the 3D model using the point set.

12. The system of claim 10, wherein the determination whether the point is geometrically consistent with the surface of the object based on one or more of the determined distances between the point and the surface of the object includes:
averaging distances between the point and the surface of the object as indicated by the set of depth maps to obtain an average distance between the point and the surface of the object.

13. The system of claim 11, wherein the determination whether the point is geometrically consistent with the surface of the object is further based on a threshold distance value such that the point is determined to be geometrically consistent when the average distance between the point and the surface of the object is less than or equal to the threshold distance value.

14. The system of claim 11, wherein whether the point is geometrically consistent with the surface of the object based on one or more of the determined distances between the point and the surface of the object includes:
truncating any distance between the point and the surface as indicated by a given depth map in the set to a preset value when the distance exceeds a threshold value.

15. The system of claim 11, wherein determining whether the point is geometrically consistent with the surface of the object based on one or more of the determined distances between the point and the surface of the object includes:
assigning a weight to each of the determined distances, and determining the distance between the point and the surface of the object based on the weighted distances.

16. The system of claim 11, wherein determining whether the point is geometrically consistent with the surface of the object based on one or more of the determined distances between the point and the surface of the object includes:

determining whether any distance between the point and the surface as indicated by a given depth map in the set is smaller than a threshold value indicating a negative distance value, and in response to determining the distance is smaller than the threshold value, excluding such a distance from the determination whether the point is geometrically consistent with the surface of the object.

17. The system of claim 11, wherein when executing the machine-readable instructions, the processor is further caused to perform: for each point in the point set, determining whether the point is photometrically consistent with the surface of the object based on the intersection points found; and, wherein the determination whether to discard the point from the point set is further based on whether the point is photometrically consistent with the surface of the object.

18. The system of claim 17, wherein determining whether the point is photometrically consistent with the surface of the object based on the intersection points found includes:

for each intersection point found: determining whether the distance between the point and intersection point is larger than a threshold value; and in response to determining the distance between the point and intersection point is larger than the threshold value, excluding the intersection point from the determination whether the point is photometrically consistent with the surface of the object.

19. The system of claim 17, wherein when executing the machine-readable instructions, the processor is further caused to perform: for each point in the point set, determining whether the point is visible with respect to each of the depth maps in the set; and, wherein the determination whether the point is photometrically consistent with the surface of the object is further based on whether the point is visible with respect to each of the depth maps in the set.

20. The system of claim 17, wherein the determination whether the point is photometrically consistent with the surface of the object based on the intersection points found is based on a standard deviation between the color values of the point and the intersection points.

* * * * *